United States Patent [19]

Mann

[11] Patent Number: 4,994,681

[45] Date of Patent: Feb. 19, 1991

[54] DEVICE FOR DETECTING THE POSITION OF A MOVING BODY, IN PARTICULAR AN AIRCRAFT, IN A PLANE

[75] Inventor: Charles Mann, Paris, France

[73] Assignee: Societe D'Etudes et D'Enterprises Electriques (S.E.E.E.), Paris, France

[21] Appl. No.: 417,762

[22] Filed: Oct. 6, 1989

[30] Foreign Application Priority Data

Oct. 7, 1988 [FR] France ................................ 88 13164

[51] Int. Cl.$^5$ ...................... G01N 21/86; G08B 21/00
[52] U.S. Cl. ..................................... 250/561; 340/958; 356/1; 358/107
[58] Field of Search ...................... 250/206.2, 560, 561, 250/221; 340/958, 937; 244/114 R; 356/1, 375; 358/107

[56] References Cited

U.S. PATENT DOCUMENTS

| | | | |
|---|---|---|---|
| 3,662,332 | 5/1972 | Zechnowitz et al. | 340/958 |
| 4,015,235 | 3/1977 | Demaine et al. | 340/958 |
| 4,184,655 | 1/1980 | Anderberg | 340/958 |
| 4,249,159 | 2/1981 | Stasko | 340/958 |
| 4,628,469 | 12/1986 | White | 358/107 |
| 4,701,047 | 10/1987 | Eibert et al. | 356/1 |
| 4,702,605 | 10/1987 | Stern et al. | 356/375 |
| 4,760,269 | 7/1988 | McKenna | 250/561 |
| 4,864,395 | 9/1989 | Tajima | 358/107 |

Primary Examiner—David C. Nelms
Assistant Examiner—Michael Messinger
Attorney, Agent, or Firm—Larson and Taylor

[57] ABSTRACT

The device includes a source of laser radiation for emitting a beam of planar and thin section in a sector having an angle of divergence adapted to the possibilities of displacement of the moving body, in a plane parallel to the plane of displacement of the moving body. A camera is reponsive to the reflection of the laser radiation from, for example, a point on the front set of wheels of an aircraft. A calculating device responsive to data received from the camera determines the distance and the azimuth of this point relative to a fixed reference, and a display device controlled by the calculating device informs the operator or the pilot of the position of the moving body.

16 Claims, 3 Drawing Sheets

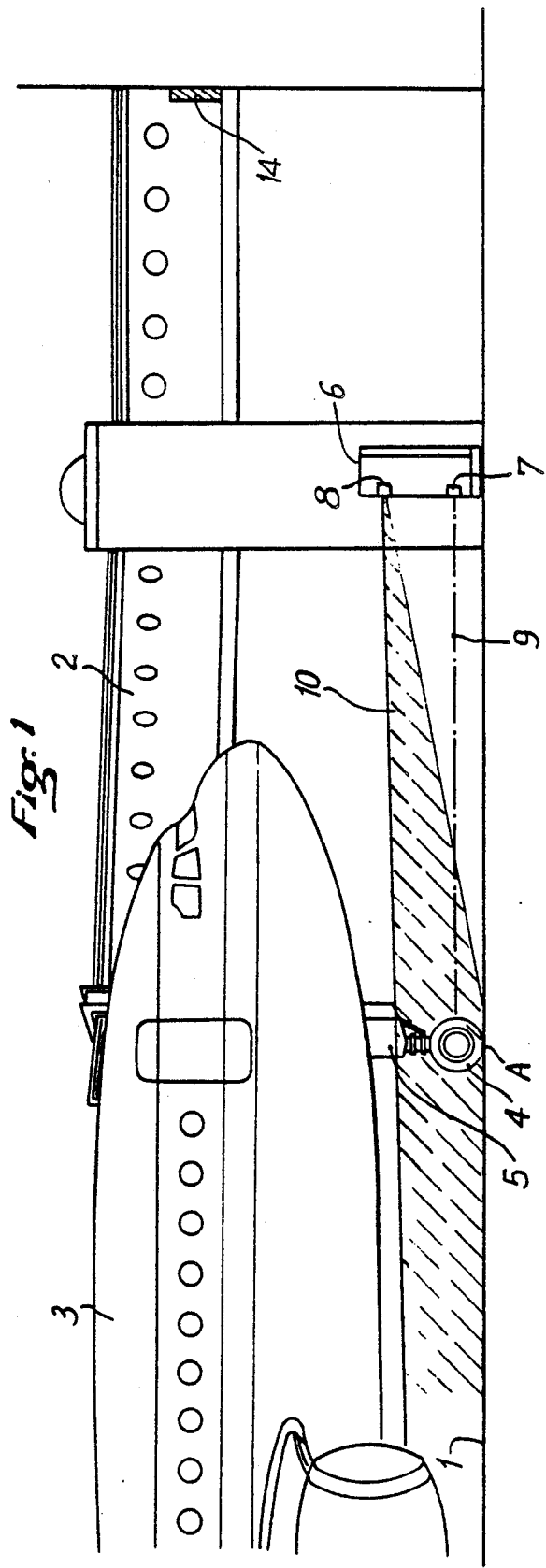
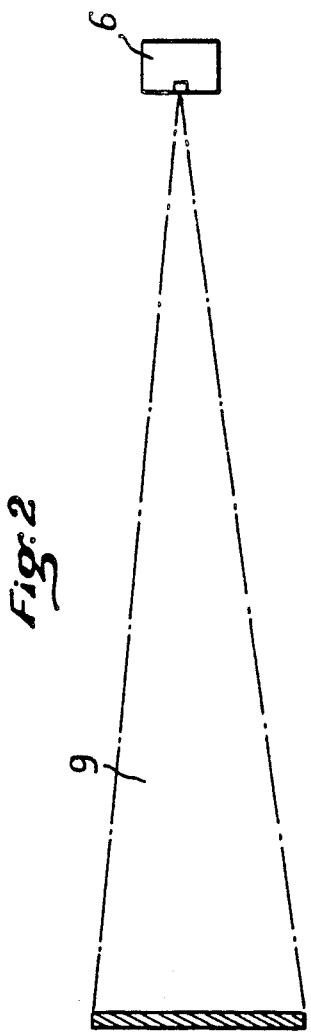

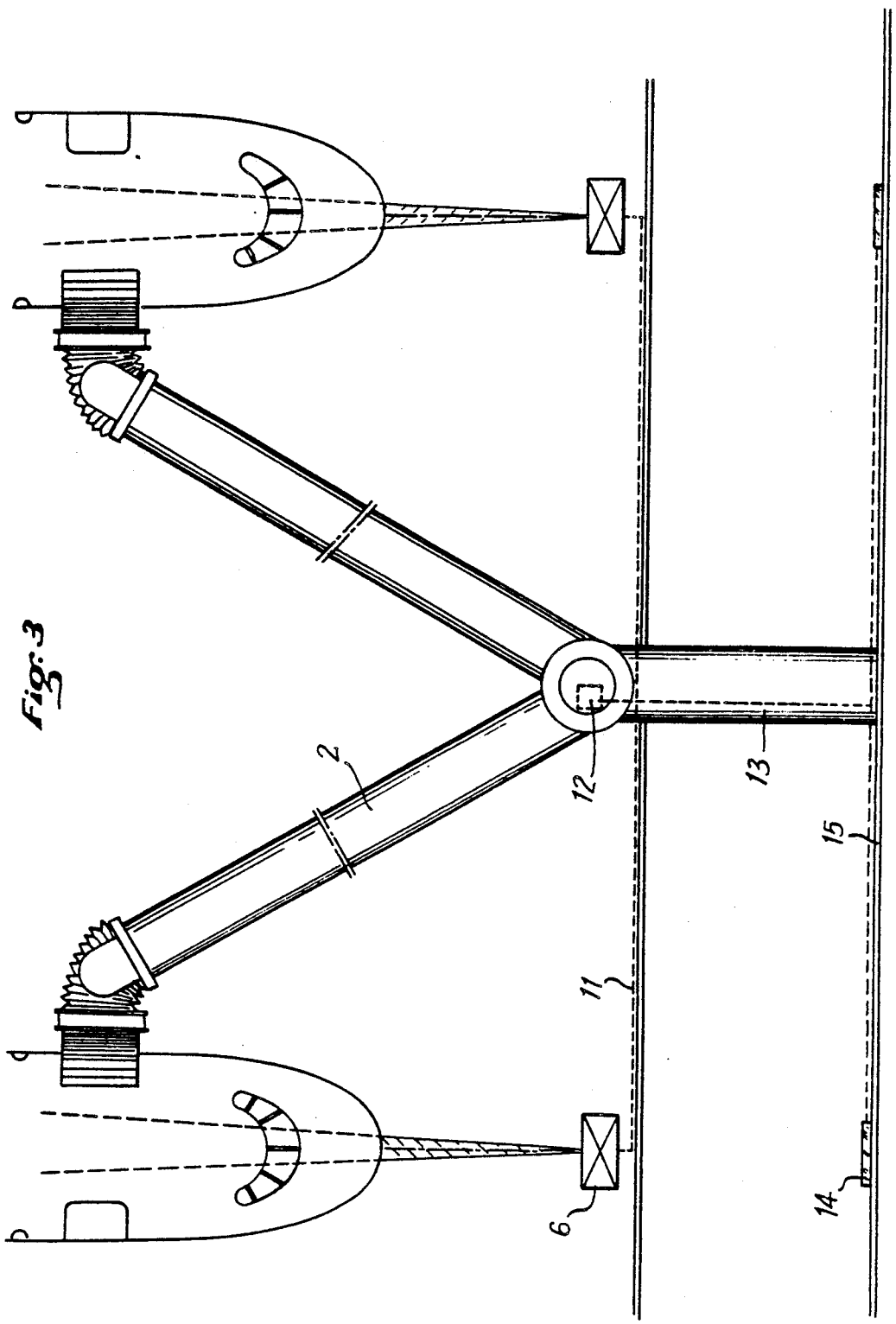

DEVICE FOR DETECTING THE POSITION OF A MOVING BODY, IN PARTICULAR AN AIRCRAFT, IN A PLANE

FIELD OF THE INVENTION

The present invention relates to a device for detecting the position of a moving body in a plane, in particular to permit guiding or controlling the movement of the moving body in the plane. The invention may be particularly applied to the guiding of an aircraft or flying machine on a flat surface constituted by an airport, in particular the guiding of an aircraft on a parking area in the direction toward and up to a passenger bridge.

BACKGROUND OF THE INVENTION

The guiding of aircraft, for example airliners, when they reach their parking area, usually in the immediate vicinity of an embarkation and disembarkation bridge, is relatively complex.

This guiding has been for a long time carried out by an operator, called a "batman" who is provided with two signals, one in each hand, and gives to the pilot, by conventional gestures, the instructions enabling him to bring the aircraft to a position in which the door is located in front of the disembarkation bridge. This is arduous work in a noisy and dangerous environment.

For the purpose of providing a solution to this problem, there have already been employed magnetic detecting means placed in the ground of the parking area and permitting the detection of the aircraft and the translation of its position on a display panel visible from the aircraft to enable the pilot to position the aircraft correctly. A device of this type is disclosed, for example, in the patent GB-A-1,508,418. Such a device is very costly to set up and in practice only permits guiding the aircraft in a small area.

Furthermore, this magnetic detecting device is placed in a complex hertzian and electromagnetic environment and does not operate under the best conditions.

Another proposed solution comprises using a device sold under the trademark UCRAFT and comprising a mast carrying an articulated arm at the end of which is provided a luminous bar which, in accordance with instructions previously entered as a function of the type of the aircraft, is placed in space at a point which is a function of the type of the aircraft and corresponds to the front of the pilot's cabin so that, when the pilot sees this point, he steers the aircraft and stops over the point.

Such a device needs a considerable mechanical infrastructure and, being composed of moving parts, requires a costly supervision and maintenance.

Guiding devices of the optical type have also been proposed for aircraft which comprise, provided on the fuselage of the aircraft, reference marks or codes, which may be detected by optical means for the purpose of locating the position of the aircraft. Such devices are disclosed in U.S. Pat. Nos. 3,775,741 and 4,249,159. These devices require marks or modifications on the fuselage of the aircraft, which is excluded in practice. Furthermore, no indication is furnished concerning the distance of the aircraft from a reference location.

In U.S. Pat. No. 3,729,262, there is provided a visual aircraft guiding device based on the use of high-intensity lamps or light sources and Fresnel lenses so as to generate two bars of light which are seen by the pilot of the aircraft and vary in their respective reference in accordance with the displacement of the aircraft. This device does not permit measuring the distance between the aircraft and a reference and requires complex optical adjustments without providing high precision.

U.S. Pat. No. 4,736,247 discloses a distance measuring device employing laser means whose beam is directed by an array of mirrors and divided into two secondary beams through a prism, the first secondary beam being directed at a video camera for creating a reference for the measurement, and the second secondary beam after having travelled through an optical path passing through three mirrors, is sent onto the moving body whose distance to the reference point is desired to be known. The two end mirrors are oriented by motors which return angular data to the computer. This device is adapted to measure the distance between two moving bodies, such as satellites. It must generate its own reference and requires an extremely costly and very complex technology.

U.S. Pat. No. 4,760,269 discloses a device for measuring the distance to an object in which a very precise image is projected by laser means onto a planar surface of the object and the image received by a video camera is studied. This device requires, on one hand, the production of an extremely precise image, and, on the other hand, the presence on the object of a planar surface onto which the image is projected, these two requirements being incompatible with the application to the guiding of an aircraft towards its parking position.

U.S. Pat. application No. EP-A-0,145,957 discloses a light emitting unit which emits a fine lasar beam and comprises a video camera for generating a measurement of the distance by triangulation of a surface relative to a known reference, a shape analysis moreover permitting overcoming the problem of non-orthogonality of this surface relative to the viewing axis of the camera. This device is intended for measurements of short distance on object surfaces which may be located in a very small zone and in a well-defined environment, such as machine tools. This device could not be adopted for use in the guiding of aircraft toward the parking position.

SUMMARY OF THE INVENTION

An object of the present invention is to provide a device for detecting the position of a moving body in a plane which is extremely reliable, of low cost, and capable of operating even in an extremely difficult environment, including outside.

Another object of the invention is to provide such a device which permits the guiding of a moving body in a plane, including bringing the moving body to a fixed and determined point.

Another object of the invention is to provide such a device for guiding aircraft in airports, in particular for bringing the aircraft to a precise point at which it is moored to a passenger bridge.

The invention provides a device for detecting the position of a moving body in a plane, said device comprising:

a source of laser radiation capable of emitting a laser beam in a sector which is planar and thin, in a direction substantially parallel to said plane, and with an angle of divergence adapted to the possibilities of displacement of the moving body in the plane for intercepting a given point of the moving body in the plane of the beam, at least one camera responsive essentially to the reflections of said laser radiation for receiving a radiation reflected by said moving point, the camera or cameras comprising, or being associated with, means responsive to the distance and to the azimuth of said point relative to a geometrically fixed reference, calculating means responsive to the data received by said camera for exploiting the data received.

In an advantageous embodiment of the invention, the camera is spaced away from the plane of propagation of the laser radiation, it being disposed either between this plane and the plane in which the moving body moves, or preferably on the side of propagation of the coherent light opposed to the plane of displacement of the moving body.

The distance between the plane of the sector of propagation of the laser radiation and the plane of displacement of the moving body is determined, according to the invention, by the distance between the given point of the vehicle whose reflected radiation is observed, and the physical plane or surface on which the moving body moves.

Preferably, in particular when human beings are made to take up a position or move in the zone of propagation of the radiation, the plane of propagation of the radiation is distinctly placed away from the level of the eyes. In an advantageous improvement, the plane of propagation may moreover be very slightly inclined relative to the physical plane or surface of displacement of the moving body so that the radiation finally encounters this surface and is attenuated and dispersed thereby, far from the utilized zone in which the displacement of the moving body is located.

Preferably, the angle of divergence of the sector is determined by a system for the optical diffraction of the light coming from a laser. This solution is preferred to that consisting in the use of a rotary or pivotable mechanical device, such as a mirror or a rotary optical device shifting a fine long beam within the aforementioned angle of divergence.

According to the invention, the camera is associated with filtering means so as to ensure that it is not responsive to wavelengths different from that of the laser radiation reflected by a moving body.

The camera is preferably located in alignment with the main axis of the lazer radiation. In such an embodiment, it is possible to determine in a simple manner the position in azimuth of the given point of the moving body by counting, in the image received by the camera, the number of pixels activated on the right and left of the median vertical of the camera by barycentric calculation.

In this embodiment, the distance between the given point of the moving body and the reference center, for example the camera, is calculated as a function of the height at which the light ray of the image received by the camera is located, this height increasing or decreasing as the moving body modifies its distance from the camera.

In its application to the guiding of aircraft, such as airliners on parking areas of airports, in particular for guiding and stopping an aircraft against one or more fixed passenger bridges, the device according to the invention comprises a source of laser radiation diffracted in a substantially horizontal plane at an angle of divergence on the order of 3° to 10°, for example 6°, at a height above the ground preferably between 0.30 meter and 1 meter and in a particularly advantageous manner on the order of 0.50 meter the central axis of the radiation being preferably aligned with the sagittal plane of the aircraft when the latter is immobilized in the correct position. The camera is preferably located substantially above the source of laser radiation, for example at a height on the order of 1 to 3 meters, preferably on the order of 2 meters, above the ground. The plane of laser radiation is preferably located at about 50 cm above the surface of the parking area and may consequently intercept the front part of the tire of the front set of wheels of an aircraft, substantially in the middle of the aircraft when the tire has an outside diameter on the order of 1 meter, or a little above the middle for slightly smaller wheels.

The laser radiation has, for example, a wavelength of 632.8 nm and the power may be advantageously on the order of 25 to 35 mW. The camera may employ advantageously an objective having a focal length on the order of 50 to 80 mm and may have a sensor having, for example, 580 lines and 520 columns namely 301,600 pixels. The camera is suitably downwardly inclined to the horizontal for determining the field of utilization in which the device is made to operate.

The angle of inclination of the camera to the vertical is for example on the order of 65 to 85.6°.

In such an application outside, the means for processing the image of the computer are advantageously so arranged as to process only the part of the image received by the camera which corresponds to the shortest distance between the camera and the reflecting surface of the aircraft so as to eliminate the lateral sets of wheels if the latter are in the angular field of the radiation.

In one embodiment of such a device, the image processing means may advantageously control according to a determined program a viewing panel which may be either inside the aircraft and disposed in the pilot's cabin, or outside and of large area for indicating to the pilot the maneuvers to carry out for reaching a desired reference point for the immobilization of the aircraft.

BRIEF DESCRIPTION OF THE DRAWINGS

Further features and advantages of the invention will be apparent from the following description which is given by way of a non-limitative example with reference to the accompanying drawing in which:

FIG. 1 is a diagrammatic elevational view of the device according to the invention for guiding aircraft on a parking area of an airport.

FIG. 2 is a diagrammatic plan view of the laser radiation,

FIG. 3 is a diagrammatic view of the top of two stations according to FIG. 1.

DESCRIPTION OF THE PREFERRED EMBODIMENTS

Figure 4:
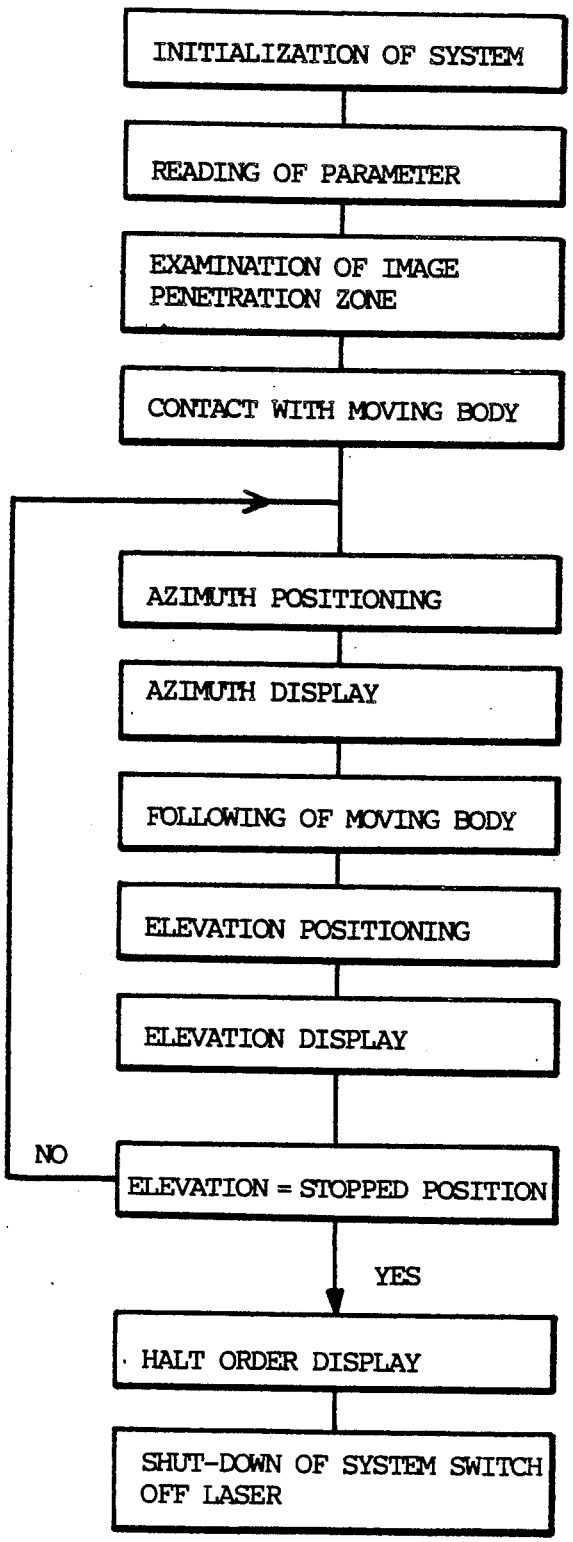
FIG. 4 is a schematic of the operational organization of a program employed when using the device.

With reference to FIGS. 1 to 3, there is shown a parking area 1 for aircraft comprising a fixed bridge 2 in front of which the aircraft 3 must be brought to a halt in a precise manner.

A fixed cabinet 6 is in the alignment of the axis of the aircraft at a distance of, for example, 11 meters from the bearing point of the wheel 4 of the front set of wheels 5 of the aircraft, when the aircraft in the exact position relative to the bridge. Disposed in this cabinet, at a first level, is a unit 7 diagrammatically represented and comprising the following elements:

a laser, for example a helium-neon laser of the make SIEMENS, having a wavelength of 632.8 nm and a power of 30 mW, a focusing means for concentrating the laser beam, an optical diffraction device for producing, at 100 meters from the device 7, a beam which is 6 meters wide and 10 mm thick, a porthole for the passage of the radiation at the level of the surface of the cabinet 6, a hood in front of the porthole for protecting the later, and optionally means for cleaning the porthole such as for example a windshield wiper.

This unit 7 is so arranged that the radiation 9 emitted whose angle of divergence is 6°, is substantially parallel to the surface 1 of the parking area and at a distance of 50 cm from this surface.

More precisely, the plane of propagation of the laser beam is slightly inclined relative to the surface of the parking area so that the radiation fades out in the ground at 150 meters.

Advantageously, it is possible to modulate the light power emitted which must be maximum during the day, in particular in the case of intense sunshine, and which may be distinctly lower during the night. Such a device may be controlled by a photoelectric cell which measures the exterior luminosity and drives an absorbent disk placed in front of the source of laser radiation.

Located at a level higher than the cabinet 6 at 2 meters from the ground, namely 1.5 meters above the source of radiation 7, is a unit 8 comprising:

a camera CCD HRS MICAM of the make SYSTEM-SUD employing a 75 cm focusing objective lens distributed by the French firm DESI NOVOLEC; this camera has a CCD sensor constituted by 580 lines and 520 columns, namely 301,600 pixels; the optical axis of the camera disposed in the vertical plane of the central axis of the laser radiation 9 is downwardly inclined to the vertical at an angle of 85.6°; the objective lens of the camera has an angle of 6.5°, corresponding to a focal length of 75 mm; inasmuch as only 500 pixels in 580 are of use, each one thereof sees a cone whose solid angle has a value of $6.5 \times 10^{-3}$°; bearing in mind the inclination of the camera to the vertical, a pixel located in the upper part of the sensor covers a horizontal surface having a length of 560 mm while a pixel located in the lower part of the sensor, corresponding to the closest points of the surface 1, sees a planar surface element having a length of 13 mm;

a MELLES-GRIOT interferential filter having a wavelength of 632,8 nm ±0.5 distributed by the French firm DESI NOVOLEC, placed in front of the camera;

a porthole enabling the camera to see the reflected radiation, a cylindrical tube placed in front of and on the axis of the camera, at a length equal to 10 times its diameter and provided on its inside with a screw thread and an anodization of a matt black colour constituting a light trap.

FIG. 1 shows in cross-hatched lines the shooting cone of the camera.

The device may also include, for reasons of safety, one or more urgent stopping pushbuttons which may be placed on the cabinet to permit the runway personnel to cut off the power supply of the laser. Gyro-beacons may be actuated during operation of the laser to warn the personnel. Further, the zones in which the lasers are employed may be indicated by panels according to the French standard AFNOR NF X 08-003.

A suitable bunch of various conductors 11 permits supplying the required electric power to the cabinet 6 and its components. It also permits recovering the electrical data of the camera and sending it to an image processing computer 12 which, as can be seen in FIG. 3, may for example be arranged to be used in two devices simultaneously. This computer may for example be a microcomputer of the type PC XT/AT sold by the firm IBM with an image processing card CYCLOP of the make SYSTEM-SUD.

This computer controls, through suitable conductors 13, a display panel 14 visible to the pilot of the aircraft and indicating, in luminous characters, to the pilot the distance at which he is positioned from the fixed point he must reach, this panel 14 also indicating that he is situated on the left or the right of the alignment axis centered on the laser beam.

In operation, when the approach of an aircraft is indicated, the computer is initialized by the indication of the type of the aircraft. The device then reads, in a data base, the items of information relating to the geometry of this aircraft and to the different associated parameters, which determines the position of the reference point A relative to the cabinet 6. The image of the camera is then examined when the aircraft is located at roughly 100 meters from the cabinet, the tire 4 of its front set of wheels comes to intercept the laser radiation 9 and, as the aircraft advances, the camera 8 receives an image comprising a radiation reflected in the direction toward the camera by the tire 4. This radiation forms in the camera a light spot which contrasts with the absence of radiation or the lower level of radiation coming from the environment. The computer analyzes this image as a function of the activated pixels. It determines in an extremely simple manner whether the aircraft is on the right or the left, by counting the number of pixels activated on each side of the central vertical line of the sensor of the camera in accordance with a calculation of the barycentric type.

A barycentric calculation of the same type is carried out in elevation or site, i.e. vertically, the light spot travelling vertically as the aircraft advances. The computer 12 may in this way determine the distance of the tire from the reference point A and the deviation of the aircraft to one side or the other of the alignment axis. As a function of these items of information, it actuates the display panel 14 which indicates to the pilot his deviation from the vertical plane containing the camera and the source of laser radiation and the distance at which the front set of wheels of the aircraft is located from the point A. When the angle of elevation corresponds to the stopped or halted position, i.e. to the point A, the computer displays the instruction on the panel to halt the aircraft and the pilot stops the aircraft. The computer then switches off the source of laser radiation and closes down the whole of the device.

I claim:

1. A device for detecting the position of a moving body in a plane, said device comprising:
   a source of laser radiation for emitting a laser beam in a sector of planar and thin cross section, in a geometrical plane substantially parallel to the plane of movement of the moving body, and with an angle of divergence adapted to possibilities of displacement of the moving body in said plane of movement for intercepting a given point of the moving body located in the geometrical plane of the beam, at least one camera for forming an image of reflections from said geometrical plane and being responsive essentially to reflections of said laser radiation for receiving radiation reflected by said point of the moving body in a position related to the distance and azimuth of said point relative to a fixed geometrical reference so that said camera generates data related to the position of the moving body in the plane of movement of the body, and calculating means responsive to data received by said at least one camera for utilizing said data.

2. A device according to claim 1, wherein the laser radiation has a wavelength of 632.8 nm.

3. A device according to claim 1, wherein the moving body travels along means defining a surface, and the laser radiation is propagated in a said geometrical plane which is very slightly inclined toward said surface so that the laser radiation is eventually attenuated and dispersed.

4. A device according to claim 1, comprising said at least one camera comprises a single camera.

5. A device according to claim 4, wherein said camera is spaced away from said geometrical plane of the laser radiation.

6. A device according to claim 5, wherein the plane of movement of the moving body is a horizontal plane and said camera in located substantially in vertical alignment with the source of laser radiation relative to the plane of movement of the moving body.

7. A device according to claim 6, wherein said camera is located vertically above the source of laser radiation.

8. A device according to claim 1, comprising diffraction means for determining an angle of divergence of the beam of the laser radiation.

9. A device according to claim 1, comprising filtering means associated with the at least one camera for ensuring that the at least one camera is not responsive to wavelengths different from wavelengths of laser radiation reflected by the moving body.

10. A device according to claim 1, wherein at least one camera has an optical axis which is inclined relative to the substantially parallel geometrical plane of the laser radiation and the plane of movement of the moving body, in a direction toward a zone of movement of the moving body.

11. A device according to claim 1, for guiding aircraft having a front set of wheels, on a parking area surface defining the plane of movement of the moving body, wherein said geometrical plane of the laser radiation is spaced away from the parking area surface by a distance which allows said laser radiation to intercept a point on the front set of wheels of the aircraft.

12. Device according to claim 11, wherein said point of the front set of wheels is formed upon a tire of said front set of wheels.

13. A device according to claim 11, wherein the distance between the parking area surface and said geometrical plane is on the order of 50 cm.

14. A device according to claim 1, wherein the laser radiation and the at least one camera are aligned in a vertical plane in which said point on the moving body must be located when the moving body reaches a halted position.

15. A device according to claim 1, comprising a display panel controlled by said calculating means for displaying data relating to position in azimuth and distance of said point.

16. A device according to claim 11, wherein the calculating means uses a program for determining a halted position of the aircraft as a function of the type of the aircraft.

* * * * *